(12) United States Patent
Abe et al.

(10) Patent No.: US 6,769,979 B2
(45) Date of Patent: Aug. 3, 2004

(54) AUTOMOTIVE AIR CLEANING SYSTEM

(75) Inventors: Yukitaka Abe, Hekinan (JP); Hitoshi Ninomiya, Kariya (JP); Motomi Mizuno, Kariya (JP); Hiroshi Kataoka, Kariya (JP); Shinji Iwama, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/395,966

(22) Filed: Mar. 25, 2003

(65) Prior Publication Data

US 2003/0186644 A1 Oct. 2, 2003

(30) Foreign Application Priority Data

Mar. 26, 2002 (JP) ........................................ 2002-086262
Feb. 26, 2003 (JP) ........................................ 2003-049411

(51) Int. Cl.[7] .............................. B60H 3/00; B60H 3/06
(52) U.S. Cl. ...................... 454/156; 454/157; 454/158; 454/337; 454/75

(58) Field of Search .......................... 454/75, 156, 157, 454/158, 337

(56) References Cited

FOREIGN PATENT DOCUMENTS

| JP | 4-353014 | * 12/1992 |
| JP | 9-290629 | 11/1997 |
| JP | 11-348552 | * 12/1999 |

* cited by examiner

Primary Examiner—Jiping Lu
(74) Attorney, Agent, or Firm—Harness, Dickey & Pierce, PLC

(57) ABSTRACT

An air cleaning system comprising an air cleaner provided on a vehicle and a device which can keep the air cleaner in operation while a vehicle is parked, whereby the quality of air inside a passenger compartment of the vehicle can be improved while the vehicle is parked. Consequently, the quality of the air can be improved in advance before an occupant enters the vehicle, and the quality of the air can further be improved without fully depending upon the function of a catalytic filter of the air cleaning system.

11 Claims, 3 Drawing Sheets

AUTOMOTIVE AIR CLEANING SYSTEM

BACKGROUND OF THE INVENTION

1. Field of the Invention

The present invention relates to an automotive air cleaner system, and more particularly to an automotive air cleaner system which can improve the quality of air through a combination of a catalytic filter and a discharge type cleaner unit such as a negative ion generator or a plasma cluster generator and which can improve in advance the quality of air inside the passenger compartment of an automobile before an occupant enters the automobile by a sub-battery and a switch for driving the discharge type cleaner unit and a blower fan provided separately from a main battery and an ignition key.

2. Description of the Related Art

Conventionally, there have been automotive air cleaning systems in which an air cleaner is provided in the interior of an air conditioner in order to clean air inside the passenger compartment of an automobile. In this case, in order to clean air inside the passenger compartment, an occupant actuates the air cleaner at the same time of or after starting up an engine after he or she has entered the automobile.

In the conventional automotive air cleaning systems, as the air cleaner is interlocked with the ignition key, the air cleaner can be actuated only at the same time, as or after starting up, the engine after the occupant has entered the vehicle. Consequently, there has existed a problem that the occupant is forced to remain in an undesirable environment for some time until the air inside the passenger compartment is cleaned after he or she has entered the vehicle.

SUMMARY OF THE INVENTION

The present invention was made in view of the problem inherent in the related art, and an object thereof is to realize an automotive air cleaning system which can clean in advance air inside the passenger compartment before the occupant enters the vehicle. In addition, another object of the present invention is to realize an automotive air cleaning system which can further improve the quality of the air through another function of the air cleaner unit which is independent of a catalytic filter thereof.

With a view to attaining the objects, according to the invention, there is provided an automotive air cleaning system comprising an air cleaner provided on a vehicle and a device which can keep the air cleaner in operation even while the vehicle is parked so as to improve the quality of air inside a passenger compartment of the vehicle while the vehicle is parked. In addition, according to the invention, there is provided an automobile air cleaning system, wherein a sub-battery is provided separately from a main battery of the vehicle, whereby the air cleaner is operated by the sub-battery. Furthermore, according to the invention, there is provided an automotive air cleaning system, wherein the quality of part of the air is improved while the vehicle is parked and the quality of the remaining part of the air is improved after an occupant enters the vehicle. Moreover, according to the invention, there is provided an automotive air cleaning system, wherein the improvement of the quality of the part of the air means removing dust from the air and deodorizing the passenger compartment, and the improvement of the quality of the remaining part of the air means further improvement in quality of the air. In addition, according to the invention, there is provided an automotive air cleaning system, wherein the improvement of the part of the air continues to be carried out until the voltage of the sub-battery lowers to below a predetermined voltage.

By adopting the aforesaid constructions it is possible to realize the automotive air cleaning system which can improve in advance the quality of part of air within the passenger compartment before the occupant enters the vehicle and which can improve the quality of the remaining part of the air after the occupant has entered the vehicle.

The present invention may be more fully understood from the description of preferred embodiments of the invention, as set forth below, together with the accompanying drawings.

DESCRIPTION OF THE PREFERRED EMBODIMENTS

Figure 1:
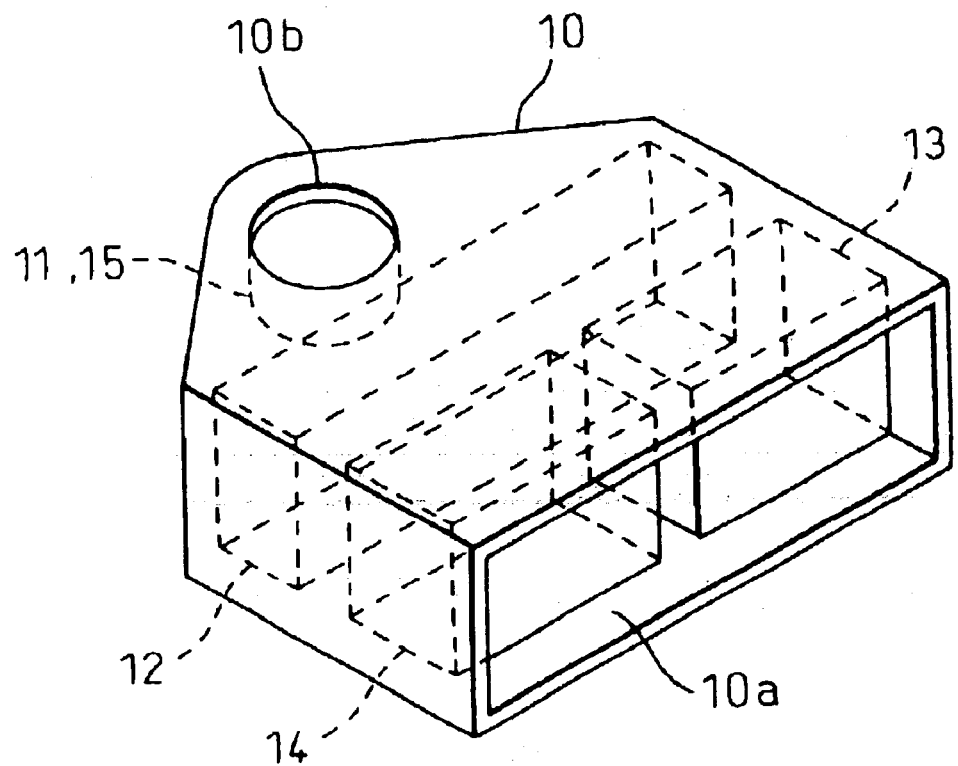
FIG. 1 is a perspective view showing a first embodiment of an automotive air cleaning system according to the invention.

FIG. 1 shows a first embodiment of an automotive air cleaning system according to the present invention. The embodiment is constructed such that dust can be removed from air within the passenger compartment of a vehicle and the passenger compartment can be deodorized, even while an ignition key is at an off position when the vehicle is parked, deodorizing the passenger compartment, and the quality of the air can continue to be improved, manually or automatically even after an occupant enters the vehicle. The air cleaning system comprises, as shown in FIG. 1, a box body 10, a blower fan 11, a catalytic filter 12, a discharge type cleaner unit 13 and a sub-battery 14. The box body 10 is formed into a box-like shape and is made open at the front to thereby form a cleaned air discharge opening 10a, and an air intake opening 10a is formed in an upper surface at the rear thereof. Then, the blower fan 11 and a motor 15 for driving the blower fan 11 are provided inside the air intake opening 10b. The sub-battery 14 may be a primary battery or a secondary battery. In addition, the sub-battery 14 may take the form of a fuel cell or a solar cell. Furthermore, the sub-battery 14 may be provided outside the box body 10. Moreover, a mode may be adopted in which the air cleaning system is directly controlled by a main battery (not shown) for the vehicle without providing the sub-battery 14.

Additionally, within the box body 10, the catalytic filter 12 is disposed in front of the blower fan 11, and the discharge type cleaner unit 13 and the sub-battery 14 are disposed in front of the catalytic filter 12. Then, the sub-battery 14 and the discharge type cleaner unit 13 are wired for connection with an electric wire, not shown, and a switch 16 (not shown) is interposed along the length of the wiring for switching on and off a current from the sub-battery.

The motor 15 for driving the blower fan 11 is preferably such as to consume so little power that it can be driven by means of the sub-battery 14, and desirably has an input wattage of 1W. In addition, the blower fan 11 is constructed to discharge air taken in from the upper air intake opening 10b into the passenger compartment from the cleaned air discharge opening 10a through the catalytic filter 12 and the discharge type cleaner unit 13.

In addition, a filter is used as the catalytic filter 12 in which a catalyst for converting an organic compound such as aldehyde which is harmful to the human body into something like carbon acid gas which is harmless to the human body is applied to a filter paper for cleaning an interface with air. Additionally, the discharge type cleaner unit 13 is constructed to generate a high voltage via an electric circuit such as a negative ion generator or a plasma cluster generator and to apply the high voltage so generated to the atmosphere to thereby generate, in turn, a high voltage in the space to produce charged particles for implementing purification through the dust removing action, chemically decomposing action and sterilizing action of the charged particles so produced.

Furthermore, the sub-battery 14 has a performance to keep the motor 15 and the discharge type cleaner unit 13 driven in the order of at least several hours when fully charged. Note that the switch 16 is not necessarily provided in the box body 10 and may be drawn out thereof so as to be provided outside the box body 10.

Figure 2:
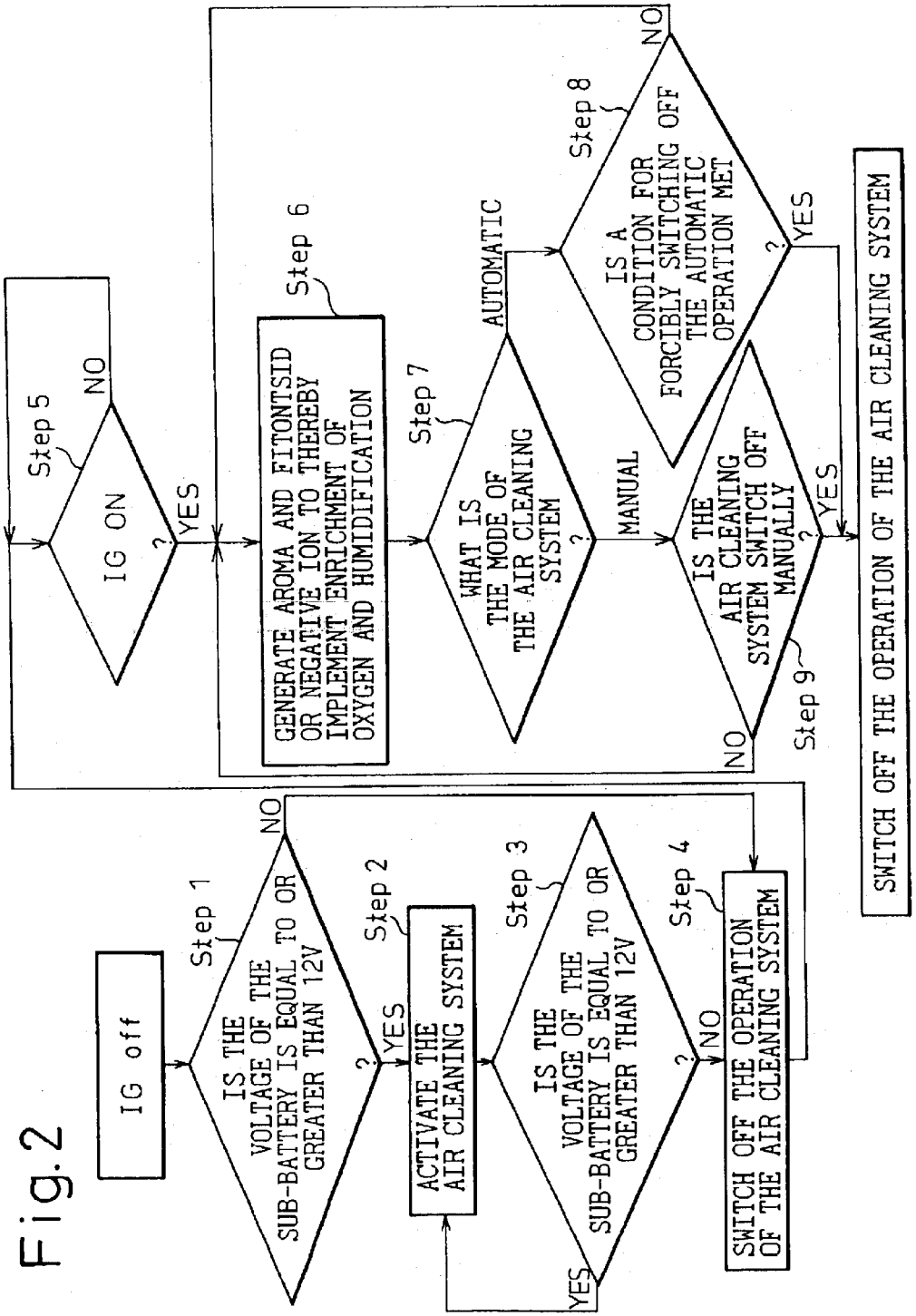
FIG. 2 is a flowchart for explaining the operation of the first embodiment of the automotive air cleaning system according to the invention.

The air cleaning system constructed as has been described heretofore is designed to operated as illustrated in a flowchart shown in FIG. 2. Firstly, when the vehicle is parked with the ignition key being located at the off position, if the switch 16 is turned on, the voltage of the sub-battery is checked (Step 1), and if the voltage is confirmed to be equal to or greater than 12V, the blower motor and the blower fan are actuated to operate the air cleaning system for removing dust from the air and deodorizing the passenger compartment (Step 2), and this operation continues until the voltage lowers to below 12V (Steps 3, 4).

Thereafter, the occupant enters the vehicle and switches on the ignition (Step 5), and, for example, aroma (fragrance) and "fitontsid" (Russian) are generated or negative ion is activated, whereby enrichment of oxygen and humidification are implemented (Step 6). Then, whether the air cleaning system is then in an automatic mode or in a manual mode is determined (Step 7), and if the air cleaning system is in the automatic mode, the quality of air continues to be improved until a condition for forcibly switching off the automatic operation (a predetermine period of time has elapsed since a further improvement of air quality is initiated) is met (Step 8), whereas if the air cleaning system is in the manual mode, the quality of air continues to be improved until the air cleaning system is switched off via the manual switch (Step 9).

Thus, according to the first embodiment of the invention, with the switch 16 being turned on, the blower fan 11 is driven by the motor 15, and air taken in from the air intake opening 10b provided in the upper part of the box body can be discharged into the passenger compartment from the cleaned air discharge opening 10a through the catalytic filter 12 and the discharge type cleaner unit 13, whereby the air inside the passenger compartment can thus be cleaned. As this occurs, and as this operation is independent from the operation of the engine, the air inside the passenger compartment can be cleaned before the occupant enters the vehicle.

Figure 3:
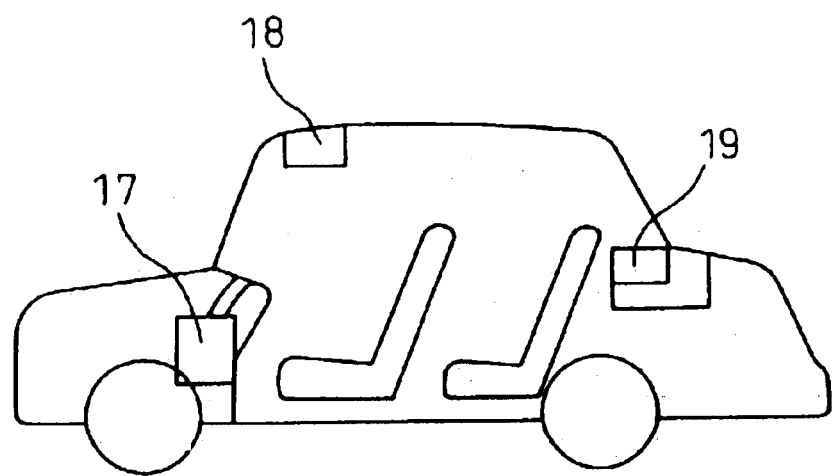
FIG. 3 is a perspective view showing a second embodiment of an automotive air cleaning system according to the invention.

FIG. 3 shows a second embodiment of an automotive air cleaning system according to the present invention. As shown in the same figure, in the second embodiment, constituent components are dispersed so that the air cleaning system can be installed in a small vehicle, and for example, as illustrated, an aromatic or humidifying device 17 is provided at a front part of the vehicle, an ion generator 18 is provided inside a ceiling portion of the vehicle, and an oxygen enrichment device 19 is provided at a rear part of the vehicle.

According to the second embodiment constructed as has been described above, as with the first embodiment, the air inside the passenger compartment can be cleaned before and after the occupant gets in the vehicle. In addition, with the air cleaning system according to the second embodiment, as the constituent components are dispersed, the automotive air cleaning system can be installed even in a small space and is hence preferable for small vehicles.

According to the automotive air cleaning system of the present invention, the quality of air inside the passenger compartment can be improved in advance before the occupant gets in the vehicle, and the quality of the air can further be improved by using not only the function of the catalytic filter but also the function of the discharge type cleaner unit of the air cleaning system.

While the invention has been described by reference to the specific embodiments chosen for purposes of illustration, it should be apparent that numerous modifications could be made thereto by those skilled in the art without departing from the basic concept and scope of the invention.

What is claimed is:

1. An automotive air cleaning system comprising an air cleaner provided on a vehicle in which the air cleaner is kept in operation even while the vehicle is parked so as to improve the quality of air inside a passenger compartment of the vehicle, said automotive air cleaning system further comprising:

a sub-battery comprising a secondary battery provided separately from a main battery of said vehicle, said sub-battery operating said air cleaner even while said vehicle is parked, first means for improving the quality of part of the air including means for removing dust from the air within the passenger compartment and means for deodorizing the passenger compartment, said first means driving said air cleaner with said sub-battery while said vehicle is parked, second means for further improving the quality of the air different from the first means for improving the quality of part of the air, said second means operating after an occupant enters said vehicle, means for determining a voltage of said sub-battery, and means for continuing the operation of said first means until the voltage of said sub-battery lowers to a predetermined voltage while said vehicle is parked.

2. An automotive air cleaning system according to claim 1, wherein said first means includes a catalytic filter for converting an organic compound which is harmful to the human body into something which is harmless to the human body.

3. An automotive air cleaning system according to claim 2, wherein a motor for driving a blower fan is driven by means of said sub-battery so that air taken in from an air intake opening is discharged from a cleaned air discharge opening through said catalytic filter into said passenger compartment.

4. An automotive air cleaning system according to claim 1, wherein said second means is a discharge type cleaner unit for performing one of a generation of an aroma and "fitontsid", an activation of negative ions, an enrichment of oxygen and a humidification.

5. An automotive air cleaning system according to claim 4, wherein components of said discharge type cleaner unit are dispersed in said passenger compartment so that one of an aromatic or humidifying device is provided at a front part of said vehicle, an ion generator is provided inside a ceiling portion of said vehicle, and an oxygen enrichment device is provided at a rear part of said vehicle.

6. An automotive air cleaning system according to claim 4, wherein said discharge type cleaner unit includes one of negative ion generator or a plasma cluster generator to generate a high voltage via an electric circuit and to apply the high voltage to an atmosphere to thereby generate the high voltage in a space to produce charged particles.

7. An automotive air cleaning system according to claim 1, wherein said means for deciding the voltage of the sub-battery is means for checking the voltage of the sub-battery while an ignition key is at an off position.

8. An automotive air system provided in a passenger compartment for cleaning air inside the passenger compartment, the automotive air system comprising:
- a catalytic filter for converting an organic compound which is harmful to the human body into something which is harmless to the human body and for removing dust from the air and deodorizing the passenger compartment,
- a discharge type cleaner unit disposed downstream in an airflow direction from the catalytic filter for performing one of a generation of aroma and "fitontsid", an activating of negative ions, an enrichment of oxygen and a humidification,
- a motor for driving a blower fan and for discharging the air taken in from an air intake opening into said passenger compartment from a cleaned air discharge opening through said catalytic filter and said discharge type cleaner unit,
- a sub-battery comprising a secondary battery provided separately from a main battery of the vehicle,
- means for determining a voltage of said sub-battery when an ignition is at an off position and the vehicle is parked,
- first means for driving said motor and said blower fan using said sub-battery when the voltage of said sub-battery is more than a predetermined voltage for cleaning the air inside the passenger compartment by only removing the dust from the air and deodorizing the passenger compartment until the voltage of said sub-battery lowers to less than the predetermined voltage,
- means for determining whether said automotive air system is in an automatic mode or in a manual mode when said discharge type cleaner unit is driven to further improve the quality of the air by performing one of the generation of aroma and "fitontsid", the activation of negative ions, the enrichment of oxygen and the humidification when the ignition key is at an on position,
- means for continuing the operation of the discharge type cleaner unit to further improve the quality of the air until the automatic operation is switched off, if the automotive air system is in the automatic mode, and
- means for driving said blower fan using said motor until a manual switch is turned off after the manual switch is turned on to clean the air by discharging the air taken in from the air intake opening into the passenger compartment through said catalytic filter and said discharge type cleaner unit from the cleaned air discharge opening, if the automotive air system is in the manual mode.

9. An automotive air cleaning system according to claim 8, wherein the switching off of the automatic operation is after a predetermined time has passed after the start of the operation of the discharge type cleaner unit to further improving the quality of the air.

10. An automotive air cleaning system according to claim 8, wherein said catalytic filter includes catalyst for converting an organic compound which is harmful to the human body into something which is harmless to the human body, the catalyst being applied to a filter paper for cleaning an interface with the air.

11. An automotive air cleaning system according to claim 8, wherein said discharge type cleaner unit has a negative ion generator or a plasma cluster generator constructed to generate a high voltage via an electric circuit and to apply the high voltage so generated to an atmosphere to thereby generate the high voltage in a space to produce charged particles.

* * * * *